United States Patent

Jones

[15] 3,701,886

[45] Oct. 31, 1972

[54] METHOD OF REPRESENTING DATA CODES WITH EQUAL WIDTH BAR AND DEVICE FOR READING SAME

[72] Inventor: John Earle Jones, Raleigh, N.C.

[73] Assignee: International Business Machines Corporation, Armonk, N.Y.

[22] Filed: Dec. 30, 1970

[21] Appl. No.: 102,722

[52] U.S. Cl..235/61.11 E, 235/61.11 D, 340/146.3 Z

[51] Int. Cl...........................................G06k 7/10

[58] Field of Search....340/146.3; 235/61.11 E, 61.11 D, 235/61.12; 88/24; 178/113

[56] References Cited

UNITED STATES PATENTS

| | | | |
|---|---|---|---|
| 2,870,429 | 1/1959 | Hales | 178/113 |
| 3,564,267 | 2/1971 | Walter | 235/61.11 E |
| 3,576,428 | 4/1971 | Kapsambelis | 235/61.12 R |
| 3,220,301 | 11/1965 | Koontz | 88/24 |

FOREIGN PATENTS OR APPLICATIONS

| | | | |
|---|---|---|---|
| 1,059,086 | 2/1967 | Great Britain | 340/146.3 |

*Primary Examiner*—Maynard R. Wilbur
*Assistant Examiner*—Robert F. Gnuse
*Attorney*—Hanifin and Jancin and John B. Frisone

[57] ABSTRACT

Binary coded data is represented on a record medium by alternate regions of differing characteristics. Adjacent regions form equal width pairs, thus the total width of the representations is not dependent on code content. Machine reading of the code is accomplished by timing a scan of the representation in the adjacent regions of the pairs of regions of alternate characteristics and comparing the scan times in both regions of each pair to determine which region in each pair is larger to thereby assign a binary one or zero value to the encoded binary bit represented by the pair.

4 Claims, 4 Drawing Figures

INVENTOR
JOHN E. JONES

BY *John B Irvine*

ATTORNEY

METHOD OF REPRESENTING DATA CODES WITH EQUAL WIDTH BAR AND DEVICE FOR READING SAME

BACKGROUND

1. Field of the Invention

The invention relates to a method of representing binary coded data on record media for retrieval at a later time and more particularly to a method of representation which may be effected by a wide variety of conventional imprinting devices. In addition, the invention also relates to a device for reading the unique representations set forth above.

2. DESCRIPTION OF THE PRIOR ART

The prior art relevant to the representation of coded data on record media is extensive; however, most require special equipment which in many cases is quite expensive to effect representation on the record media. In other instances where representation is easily effected, by means such as an ordinary typewriter, the code densities were low for encoding sufficient data on relatively small media such as wallet size credit cards in current use.

SUMMARY OF THE INVENTION

The invention contemplates a method of representing groups of binarily coded multibit characters on a record medium by unique combinations of alternating regions of dissimilar characteristics arranged in pairs of equal extend. Each of the pairs define one binary bit of the character. A pair defines one binary state when the extent of the first region exceeds the second and the other binary state when the extent of the second region exceeds the first. In addition, the invention contemplates a unique and novel structure for detecting and reading the novel code representations set forth above.

DESCRIPTION OF THE PREFERRED EMBODIMENT

Figure 1:
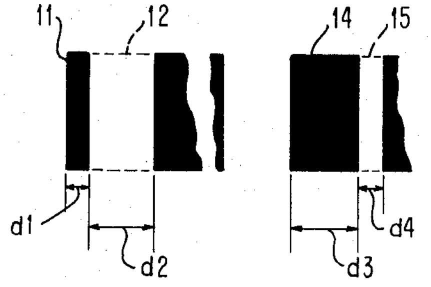
FIGS. 1 and 2 are plan views of a coded representation according to the invention.

FIG. 1 graphically illustrates a bar type code which satisfies a number of necessary requirements. The figure illustrates how binary ones and zeros are represented. A first region 11 having a first light reflective characteristic extends in the horizontal direction a distance d1 and a second region 12 having a different light reflective characteristic extends a distance *d*2. The two dissimilar regions constitute a pair and identify a logical "one" in the binary system. The logic "zero" in the binary system is represented by the regions 14 and 15 extending distances *d*3 and *d*4, respectively. The sum of distances *d*1 and *d*2 is constant and equals the sum of distances *d*3 and *d*4. Thus, where the bit length of the characters is fixed, the horizontal dimensions of the character representation is independent of the data encoded and is invariable.

When the coded data is scanned by a movable scanning device, the different light reflective areas are detected and the time required to scan the different regions is noted. The time required to scan the different regions provides the information necessary to determine the code represented. When the time required to scan the first region in a pair is less than the time required to scan the second region, the pair represents the binary "one" state. If the time required to scan the first region is greater than the time required to scan the second region, the pair represents the binary "zero" state. Pair 11, 12 thus represents the binary "one" state while pair 14, 15 represents the binary "zero" state.

Figure 2:
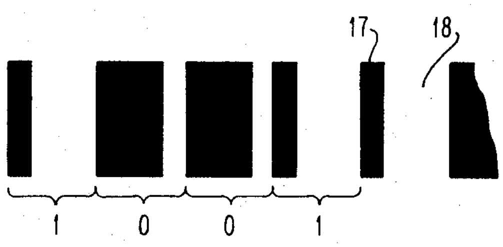

A single four-bit binary character representation is illustrated in FIG. 2. The horizontal extent of the representation of each binary bit is constant and the horizontal extent of each character, in the set of characters, is constant. Four bits per character thus provides a 16 character set. If a larger character set is required, the number of bits represented per character must be increased. A full alpha numeric set can be represented by six-bit characters which provide 64 unique representations.

The code representation described above is, due to its format, suitable for manual scanning in which a transducer is manually propelled across the representations. The code representations will tolerate accelerations and decelerations within the human capabilities of a cooperative operator. In addition, it does not place stringent requirements on reproduction facilities. Thus, reproduction is feasible with ordinary typewriter mechanisms. Studies indicate that a four-bit representation at ten characters per inch can tolerate accelerations and decelerations of up to two "G" and simultaneously therewith a 50 percent dimension error on the representations of the bar widths.

The code illustrated in FIG. 2 is provided with an intercharacter bit, regions 17 and 18. For single characters, region 17 only is necessary to delineate the termination of the last bit of the character. In a string of characters, regions 17 and 18 provide an intercharacter separator during which the character code may be transmitted. However, if density is critical, the regions may be reduced in size or eliminated entirely. Such a change will require minor modifications to the reading circuits and these will be covered below in connection with the description of the reading circuits.

Figure 3:
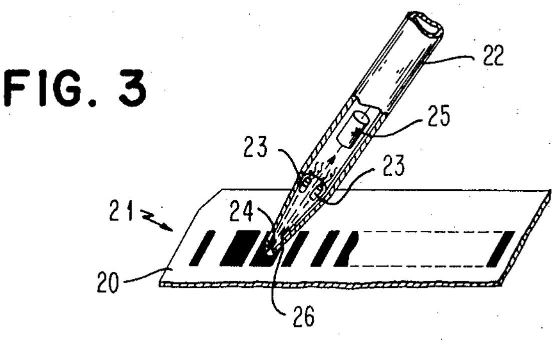
FIG. 3 is a perspective view of a coded media and scanning device in operative relationship.

FIG. 3 illustrates a record media 20, such as a credit card, bearing coded alternating regions of dissimilar characteristics 21 being scanned by a scanning pen 22. Pen 22 is suitable for hand propulsion and can be moved across the coded data by an operator. The pen is provided with one or more light sources 23 and a lens system 24 which focuses the light on the media. Light reflected from the media is received by a photoreceiver 25 which may be a photodiode or transistor. The reflective characteristics of the regions differ substantially. One region has a reflective characteristic which provides sufficient reflected light to activate photoreceiver 25 while the reflective characteristics of the adjacent region are selected to reflect insufficient light to activate the photoreceiver 25. A switch 26 is provided in the body of the pen and is actuated whenever the pen 22 is placed in contact with the media. The function of switch 26 will be described in detail later.

Figure 4:
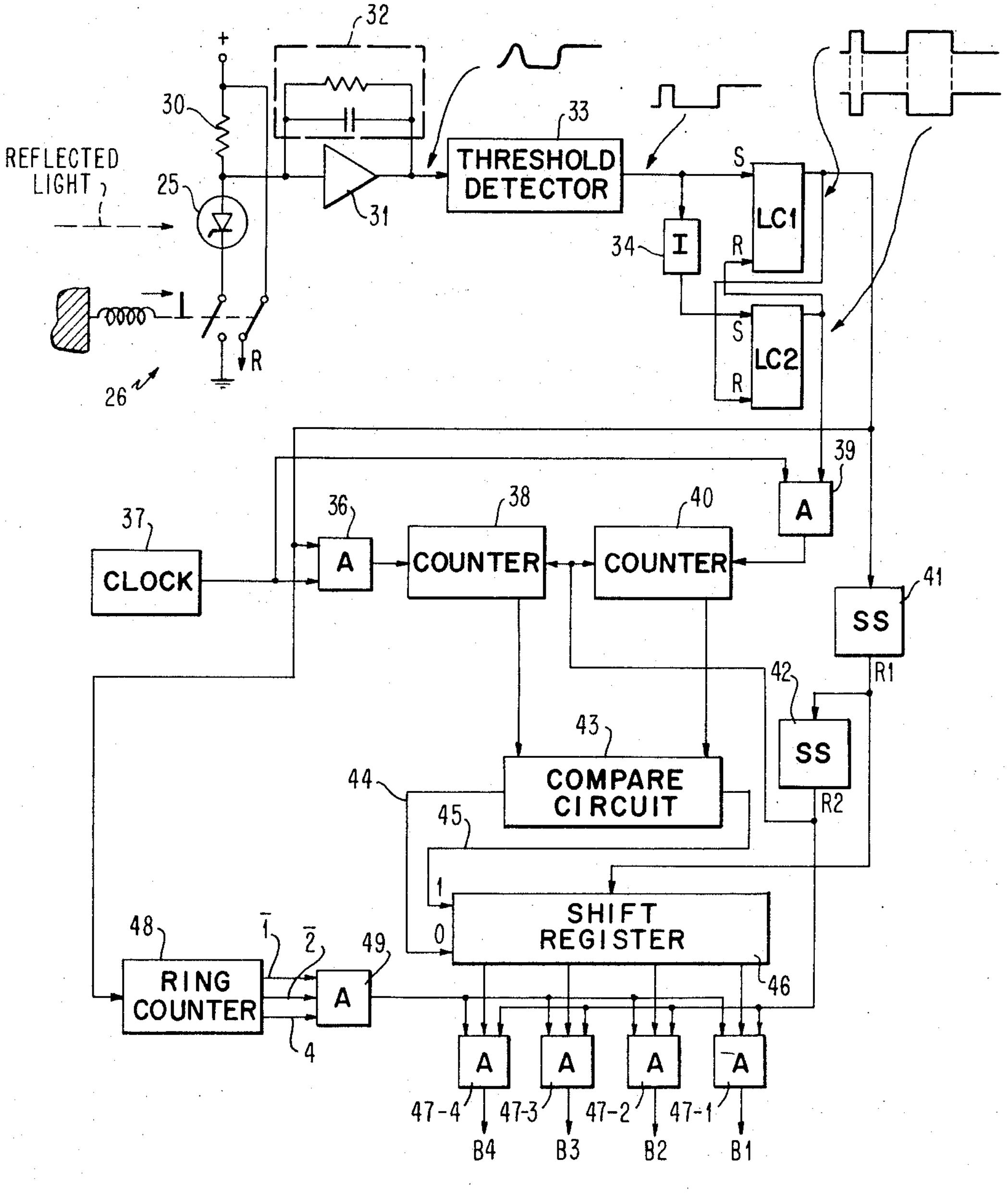
FIG. 4 is a schematic diagram of a novel detector and reader suitable for detecting and reading the coded representations of FIGS. 1 and 2.

In FIG. 4, photodiode 25 has one electrode connected to the voltage source by a resistor 30 and its other electrode connected to ground by switch 26 when the pen body 22 is in engagement with the media 20. With the circuit to ground completed, the voltage at the common junction of diode 25 and resistor 30 will vary as a function of the impedance of diode 25 which varies as a function of incident light. The common junction of resistor 30 and diode 25 is connected to the input of a high-gain amplifier 31 which is provided with a parallel resistor-capacitor feedback network 32. The output of amplifier 30 is connected to a threshold detecting circuit 33 which provides a substantially square wave output. A typical output for the encoded data illustrated in FIG. 2 is shown.

The output of the threshold detector 33 is applied to the set input of a latch LC1 which provides an output C1 when the latch LC1 is set and via an inverter 34 to the set input of a latch LC2 which provides an output C2 when the latch LC2 is set. Output C1 is applied to the reset input of latch LC2 and the output C2 is applied to the reset input of latch LC1, thus, at any time only one of the outputs C1 and C2 can be positive. Both may be simultaneously negative if latches LC1 and LC2 are simultaneously reset.

The C1 signal is applied to an AND circuit 36 which passes clock pulses from a source 37 to a counter 38. The count accumulated in counter 38 thus corresponds to the extent of the C1 pulse which in turn corresponds to the extent of the C1 pulse which in turn corresponds to the extent of the first region of each pair or the time required for the pen 22 to traverse the first region. In a similar manner, the C2 signal is applied to an AND circuit 39 which passes clock pulses from source 37 to another counter 40. This counter accumulates a clock pulse count during the time period the pen 22 traverses the second region of each pair.

The C1 signal is applied to a single shot circuit 41 which provides a very narrow pulse R1 which occurs substantially simultaneously with the rise of C1 and decays very quickly. In addition, the R1 pulse is applied to another single shot circuit 42 which provides a pulse R2 which occurs after R1. The extent of pulses R1 and R2 is a small fraction of the extent of C1 and both occur in the initial portion of C1. The R2 pulse is applied to counters 38 and 40 and resets both counters so that the C1 and C2 counts reflect the times required to traverse the first and second regions of each pair. The C1 count in counter 38 lacks a small portion of time due to the time required to generate R2, however, a correction factor can be introduced for a nominal pen velocity without impairing operation. The correction factor can be implemented in several ways. The actual extent of the first portion can be adjusted or the reset value of counter 38 can be selected at a value other than zero.

The outputs of counters 38 and 40 are connected to a compare circuit 43 which continuously compares the values of the two counters and provides a first output on a conductor 44 when the value of counter 38 exceeds that of counter 40 and a second output on a conductor 45 when the value of counter 40 exceeds the value of counter 38. Conductors 44 and 45 are connected to the "zero" and "one" inputs, respectively, of a shift register 46. The R1 signal is also applied to the shift control of shift register 46 and thus a "one" or "zero" is shifted into the register with R1 depending on the condition of lines 44 and 45 at that time. The successive signals from compare circuit 43 defining the coded data are shifted into register 46. After five shifts, a four-bit signal representing the character encoded on the media resides in register 46. This data is gated out via four AND circuits 47-1, 47-2, 47-3 and 47-4 which are under control of a ring counter 48 and the R2 pulse.

The C1 signal is applied to the step input of ring counter 48 which counts from 0–4 cyclically. The count of 4 is the reset position as well as the sample position and an AND circuit 49 detects this condition. The output of circuit 49 provides one of the two enabling inputs of gates 47-1 to 47-4. The R2 pulse provides the other input.

A second switch contact of switch mechanism 26 provides a positive voltage general reset signal R which is used to reset counters 48, 38 and 40 as well as latches LC1 and LC2. This reset is in addition to those illustrated and occurs any time the pen is out of contact with the media.

OPERATION OF THE INVENTION

When the pen 22 is placed in reading position (in contact with the media) by the operator, the general reset is removed. The pen will be in a blank area and the C2 signal will enable gate 39 causing counter 40 to increment. As the pen 22 enters the first region of the first pair, C2 will drop and C1 will rise. The counter 48 will step from 4 to 0. The R1 pulse will shift a "one" into register 46. This "one" is not valid data and will not be present at readout time. The following R2 pulse will reset counters 38 and 40. AND circuits 47-1 to 47-4 will not be enabled with R2 at this time since counter 48 is at 0. Signals C1 and C2 will in sequence, control the values counters 38 and 40 achieve. The compare circuit 43 will provide at R1 generated by the next C1 a "one" or "zero" depending on comparison of the values of counters 38 and 40 at R1 time. This sequence is repeated 3 more times as the pen traverses the representations on the media and when counter 48 reaches a value of 4, the data in shift register 46 is gated out at R2 time. The intercharacter representations cause counter 48 to go from 4 to 0 and the data generated during this time interval drops off the end of shift register 46 before the next data sample time. The successive characters represented on the media are successively made available at the outputs of gates 47-1 to 47-4.

While the invention has been particularly shown and described with reference to a preferred embodiment thereof, it will be understood by those skilled in the art that various changes in form and details may be made therein without departing from the spirit and scope of the invention.

What is claimed is:

1. Means for reading binarily coded data represented on a media in the form of a plurality of regions of alternating characteristics and in which adjacent regions of alternate characteristics are paired, each said pair extending an equal distance and encoding one binary state when the first region of the pair exceeds the second in extent and the other binary state when the second region exceeds the first in extent, said means for reading the represented data comprising:

movable means under operator control for scanning the represented data and providing a first electrical manifestation when scanning a region of one characteristic and a second electrical manifestation when scanning a region of alternate characteristic;

first circuit means, responsive to said first and second electrical manifestations provided when scanning a pair of regions of alternate characteristics, for supplying a first output when the first electrical manifestation associated with a pair of regions persist longer than the second electrical manifestation associated with the same pair of regions and a second output when the second manifestation of a pair persists longer than the first of the same pair;

second circuit means responsive to the first circuit means outputs and the said first electrical manifestations for registering the output condition of the said first circuit means for a previous pair at the onset of a subsequent pair of manifestations; and third circuit means responsive to a predetermined number of successive first manifestations for enabling a readout of the said second circuit means.

2. A reading means as set forth in claim 1 in which said first circuit means comprises:

first signal conditioning means responsive to said first and second electrical manifestations for providing first and second outputs in time correspondence with said first and second manifestations, respectively;

clock means for providing clocking pulses;

first counter means for counting clocking pulses from the clock means under control of the said first output from the said first means;

second counter means for counting clocking pulses from the clock means under control of the said second output from the said first means; and circuit means responsive to the first and second counter means for continuously comparing the counter values and providing a first output when the value of the first counter means exceeds that of the second counter means and a second output when the value of the second counter means exceeds that of the first.

3. A reading means as set forth in claim 2 in which said second circuit means comprises a shift register responsive to said first and second outputs from said comparison means for registering a binary one or zero depending on the condition of the said outputs to thereby register the binary value represented on the media for each pair at the onset of the subsequent pair.

4. A reading means as set forth in claim 3 in which said third circuit means comprises;

a ring counter responsive to the first output from the first signal conditioning means for cyclically counting successive first output conditions; and gate means responsive to a predetermined state of said ring counter for making available the contents of the shift register.

* * * * *